March 12, 1963 R. B. FULLER 3,080,583
UNDERSEA ISLAND
Filed June 8, 1959 8 Sheets-Sheet 1

FIG. 1

INVENTOR.
R. BUCKMINSTER FULLER
BY
*Pollard, Johnston, Smythe & Robertson*
ATTORNEYS.

March 12, 1963

R. B. FULLER 3,080,583

UNDERSEA ISLAND

Filed June 8, 1959

INVENTOR.
R. BUCKMINSTER FULLER
BY
*Pollard, Johnston, Smythe & Robertson*
ATTORNEYS.

March 12, 1963     R. B. FULLER     3,080,583
UNDERSEA ISLAND Filed June 8, 1959     8 Sheets-Sheet 4

INVENTOR.
R. BUCKMINSTER FULLER
BY
*Pollard, Johnston, Smythe & Robertson*
ATTORNEYS.

FIG. 9

March 12, 1963 R. B. FULLER 3,080,583
UNDERSEA ISLAND

Filed June 8, 1959 8 Sheets-Sheet 6

INVENTOR.
R. BUCKMINSTER FULLER
BY
*Pollard, Johnston, Smythe & Robertson*
ATTORNEYS.

March 12, 1963 R. B. FULLER 3,080,583
UNDERSEA ISLAND
Filed June 8, 1959 8 Sheets-Sheet 7

FIG. 13

INVENTOR.
R. BUCKMINSTER FULLER
BY
ATTORNEYS.

March 12, 1963 R. B. FULLER 3,080,583
UNDERSEA ISLAND

Filed June 8, 1959 8 Sheets-Sheet 8

INVENTOR.
R. BUCKMINSTER FULLER
BY
Pollard, Johnston, Smythe & Robertson
ATTORNEYS.

3,080,583
Patented Mar. 12, 1963

1

3,080,583
UNDERSEA ISLAND
Richard Buckminster Fuller, 104—01 Metropolitan Ave.,
Forest Hills 75, N.Y.
Filed June 8, 1959, Ser. No. 818,935
2 Claims. (Cl. 9—8)

The invention relates to an undersea island and an improved anchoring system therefor. My undersea island has special application to offshore oil drilling rigs and I shall describe it with particular reference to this field of use. However, the invention will be valuable for other purposes such as its use as a manned operating base in explorations of the ocean bottom. Thus the invention can be applied to the purposes of the broad oceanographic program currently being advocated by the National Academy of Sciences.

The extension of offshore oil well drilling into deeper and less sheltered waters has created enormous engineering problems in the design, construction and maintenance of drilling platforms. The most acceptable solution to date has been the use of barges provided with equipment for erecting fixed platforms on pilings driven into the ocean floor. Sometimes a lower barge hull is sunk to the bottom. According to another system the barge hull is jacked up on the driven pilings to make an elevating deck on which the drilling installations are carried. See Drilling's, Special American Petroleum Institute Section, February 26–28, 1958, Associated Publishers, Inc., Dallas, pp. 30–34. The cost of building and erecting such rigs is enormous, but this is only part of the story for it still leaves the problem of maintaining an installation which is exposed to the buffeting of wind and sea, and the losses sustained when the gales and hurricanes blow can be prodigious. One of the principal objects of my invention as applied to offshore oil well rigs has been to provide an installation which is less at the mercy of the elements.

An offshore oil well rig according to my invention comprises in essence an undersea island having an anchoring system which effectively restrains it against motion other than a moderate movement up or down as the tide comes in and runs out. The "island" is a submerged caisson within which is installed the derrick or its equivalent, and other installations common to oil drilling operations. A hollow communications shaft extends from within the caisson to a boarding platform above the surface of the sea. I am aware that it has been proposed heretofore to support well drilling apparatus above a submerged buoyant tank arrangement, but my invention is concerned more particularly with providing a more practical solution including an improved anchoring system and other improvements which make it feasible to move the heart of the well drilling operations into a caisson under the sea.

My invention in its general arrangement comprises an undersea island including a buoyant caisson submerged under the pull of anchor rodes extending from the sides of the caisson to anchors distributed around it, several of the rodes extending tangentially clockwise and several tangentially counterclockwise, the former constituting a group of rodes tending to produce clockwise rotation of the caisson about a vertical axis and the latter constituting a group of rodes tending to produce counterclockwise rotation. The one group of rodes creates a torque which is equal and opposite to that created by the other. This has the result that the caisson is fixed in the grip of opposed torques while yielding to slow vertical movement with the tides against the resilient pull of the catenary sags in the rodes. The anchor rodes preferably comprise three pairs of counter-torquing rodes secured to the caisson at a common horizontal level and three other pairs of counter-torquing rodes secured to the caisson at another horizontal level spaced from the first. Or there may be just three criss-crossing pairs of rodes distributed so as to extend tangentially away from the sides of the island in several directions. The anchors for one rode of each pair define the base corners of a tetrahedron whose apex is the undersea island and the anchors of the other rode of each pair define a similar tetrahedron. Thus we have what may be described as two counter-torquing tetrahedra.

In its special application to an offshore oil well rig, my invention comprises a buoyant caisson submerged under the pull of anchor rodes arranged in the manner described above, marine oil well apparatus including derrick structure within the submerged caisson, and a hollow communications shaft extending from the caisson to a boarding platform above the surface of the sea. The caisson is fixed in the grip of opposed torques created by the oppositely extending tangential rodes while the shock of surface seas on the surface and near-surface parts of the rig is absorbed by the resilient pull of the catenary sags in the rodes.

In the drawings, wherein I have illustrated the best mode contemplated by me for carrying out my invention.

Figure 1:
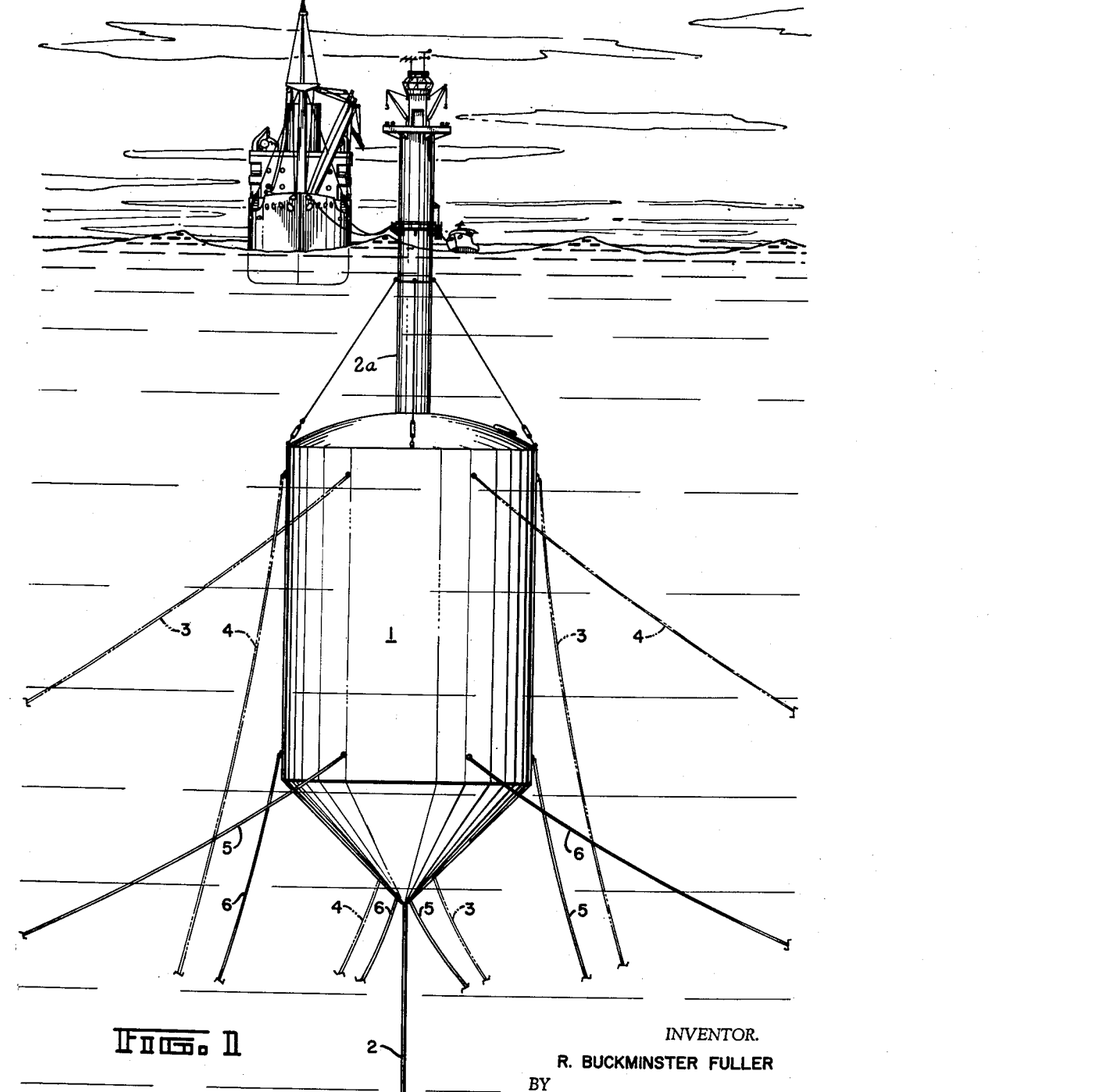
FIG. 1 is a side elevational view of an offshore oil well rig embodying my invention in one of its preferred forms.
Figure 9:
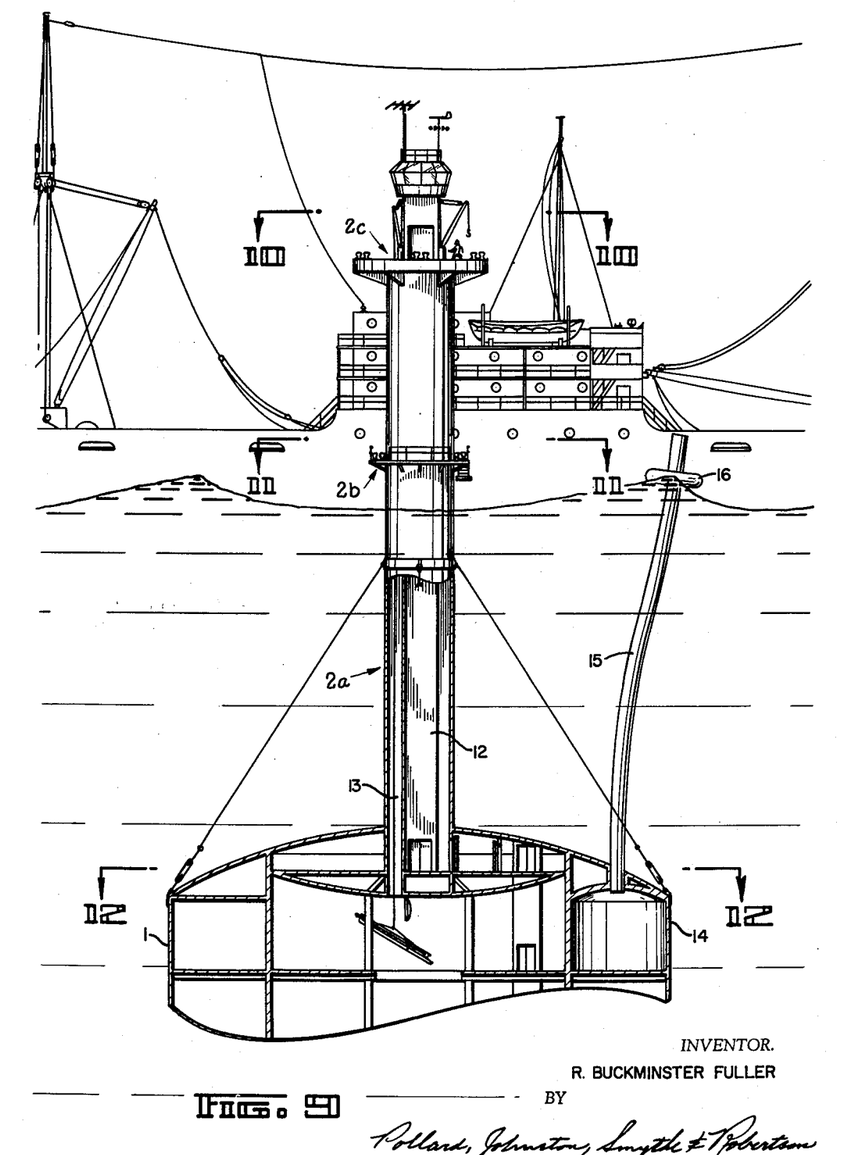
FIG. 9 is an enlarged view of the upper part of the rig of FIG. 1, the upper part of the caisson and part of the communications tower broken away in vertical cross section.

In FIG. 1 we see the submerged caisson 1 of an offshore oil well rig below which at 2 extends the drill pipe casing. The mast-like structure 2a above the casing is a hollow communications shaft extending from within the caisson to boarding and cargo loading decks 2b and 2c (FIG. 9) above the surface of the sea. Boarding from a small boat and transfer of operational cargo, such as drill pipe, from a mother ship are indicated pictorially. This view also shows how the buoyant caisson 1 is submerged under the pull of anchor rodes distributed around it.

Figure 2:
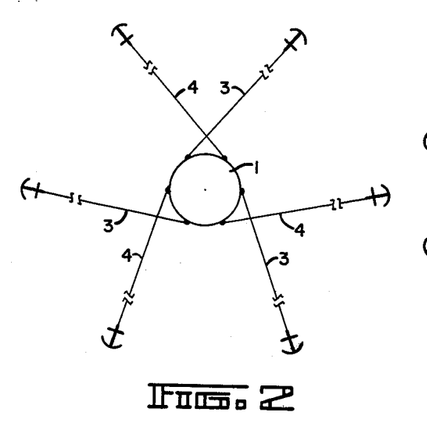
FIG. 2 is a schematic plan view showing three criss-crossing pairs of counter-torquing anchor rodes. Also this view may be understood as representing a plan view of the anchor rode arrangement for the caisson of the offshore oil well rig of FIG. 1 in which there are six such criss-crossing pairs of rodes, three pairs at each of two different horizontal levels.

The arrangement of the rodes is of the greatest importance in achieving primary benefits of my invention. Referring to FIGS. 1 and 2, we see the rodes extending from the sides of the caisson to anchors distributed around it. Because of the considerable distance between the caisson and the anchors, the full length of the rodes cannot be shown within the scale of the drawing; so these and succeeding views are to be read with the understanding that there will be long intermediate sections of the cables between the break lines as shown particularly in FIGS. 2–5. The several rodes 3 extend tangentially clockwise and the several rodes 4 tangentially counterclockwise, FIG. 2, the former constituting a group of rodes tending to produce clockwise rotation of the caisson about a vertical axis and the latter a group of rodes tending to produce counterclockwise rotation. The one group of rodes creates a torque which is equal and opposite to that created by the other. The result of this is to fix the caisson in the grip of opposed torques while it yields to slow vertical movement with the tides against the resilient pull of the catenary sags in the rodes. Notice that there are three pairs of counter-torquing rodes 3—4 as shown in FIG. 2. Notice also that the rodes of each pair 3—4 are in criss-crossing relationship. In the preferred arrangement shown in FIG. 1, there are three pairs, 3—4, of counter-torquing rodes secured to the caisson at a common horizontal level, and three other pairs, 5—6, secured to the caisson at another horizontal level spaced from the first. This arrangement produces vertical stability of the caisson as it is held within the frame of reference of the counter-torquing rodes. A peculiar effect of the particular arrangement of the rodes is that the caisson is resiliently but closely restrained in what amounts practically to a position of immobility, yet allowing for extremely slow vertical movement with the tides. If desired the vertical movement can be controlled during drilling operations by pumping sea water in or out of the flotation tanks associated with the caisson. But regardless of this the caisson will always be fixed in the grip of the opposed torques of the several pairs, preferably three or six, of criss-crossing rodes.

It is also to be observed that the anchors for one rode of each pair, i.e. the rodes 3 for example, define the base corners of a tetrahedron whose apex is the caisson or underesea island, while the anchors of the other rode 4 of each pair, define a similar tetrahedron. Thus we have a system which may be described and understood as consisting of two counter-torquing tetrahedra. As such the system yields improved, and I might say unique, results in terms of stability. It will be appreciated that the characteristic of stability and the degree in perfection of this characteristic is of extreme importance when my anchoring system is used as applied to offshore well drilling rigs. If, as in accordance with my invention, the drilling rigs are to be freed from such operational limitations as the driving of pilings into the ocean floor, the buoyant caisson which takes the place of the fixed platforms supported on such pilings, must have unusual stability of position as compared with ships at anchor. Perfection of stability also becomes a matter of vital concern when my undersea island is used as a manned operating base in explorations of the ocean bottom or as an undersea naval base including provision for undersea docking of submarines.

Figure 3:
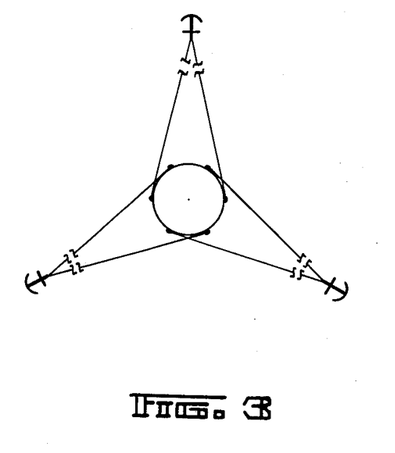
FIG. 3 illustrates a special case in which the three (or six) pairs of criss-crossing rodes extend to three points of anchorage instead of six (or twelve). The doubling up at the anchors does not detract from the efficacy of the arrangement as there are still two counter-torquing tetrahedra in the system.

FIG. 3 illustrates a special case in which the three pairs of criss-crossing rodes extend to three points of anchorage instead of six; when there are three pairs of rodes at separated levels as in FIG. 1, we would have according to the FIG. 3 case, six pairs of criss-crossing rodes extending to either three or six points of anchorage instead of six or twelve. The doubling up at the anchors does not detract from the efficacy of the arrangement as there are still at least two counter-torquing tetrahedra in the system.

Figure 4:
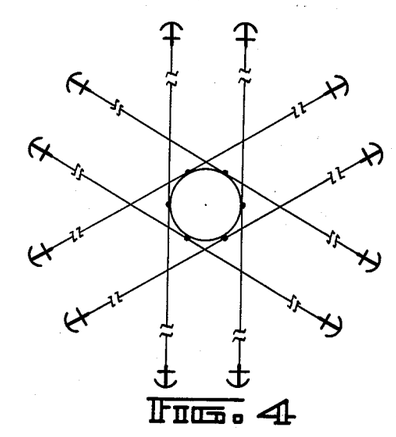
FIG. 4, another schematic plan view, shows a twelve anchor system.

FIG. 4 shows a twelve anchor system resulting in two sets of counter-torquing tetrahedra. Essentially this is a system which simply multiplies the system of FIG. 2 by the factor 2.

Figure 5:
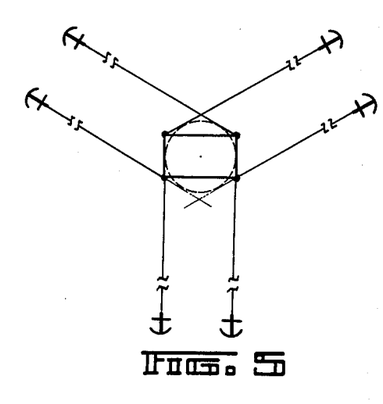
FIG. 5 is included to show how my counter-torquing system is applicable regardless of the form of the caisson.

FIG. 5 shows how my counter-torquing system is applicable regardless of the form of the caisson, the caisson in this instance being rectangular as viewed in plan.

I have described the rodes as extending "tangentially clockwise" and "tangentially counterclockwise." In this context my use of the descriptive "tangentially" is not restricted to the exact "tangent" of the mathematician. And, of course, it will be understood that when we have a rectangular caisson as in FIG. 5, there can be no mathematical tangent; nevertheless there is in practical effect and in substance the same "tangential" arrangement as obtains in FIGS. 2, 3 and 4. I direct attention also to the fact that in FIG. 2, the angle between the rodes and the radius intersecting their points of attachment is greater than 90°; in FIG. 3, less than 90°; and in FIG. 4, exactly 90°. And in FIG. 5 with reference to the imaginary superimposed circle, there is an exact 90° tangency to a theoretical point of attachment of the rodes. Thus, according to my definition, a disposition of the anchor rodes which is substantially tangent as distinguished from radial is regarded as being "tangential" and will confer the primary benefits of my invention.

Figure 6:
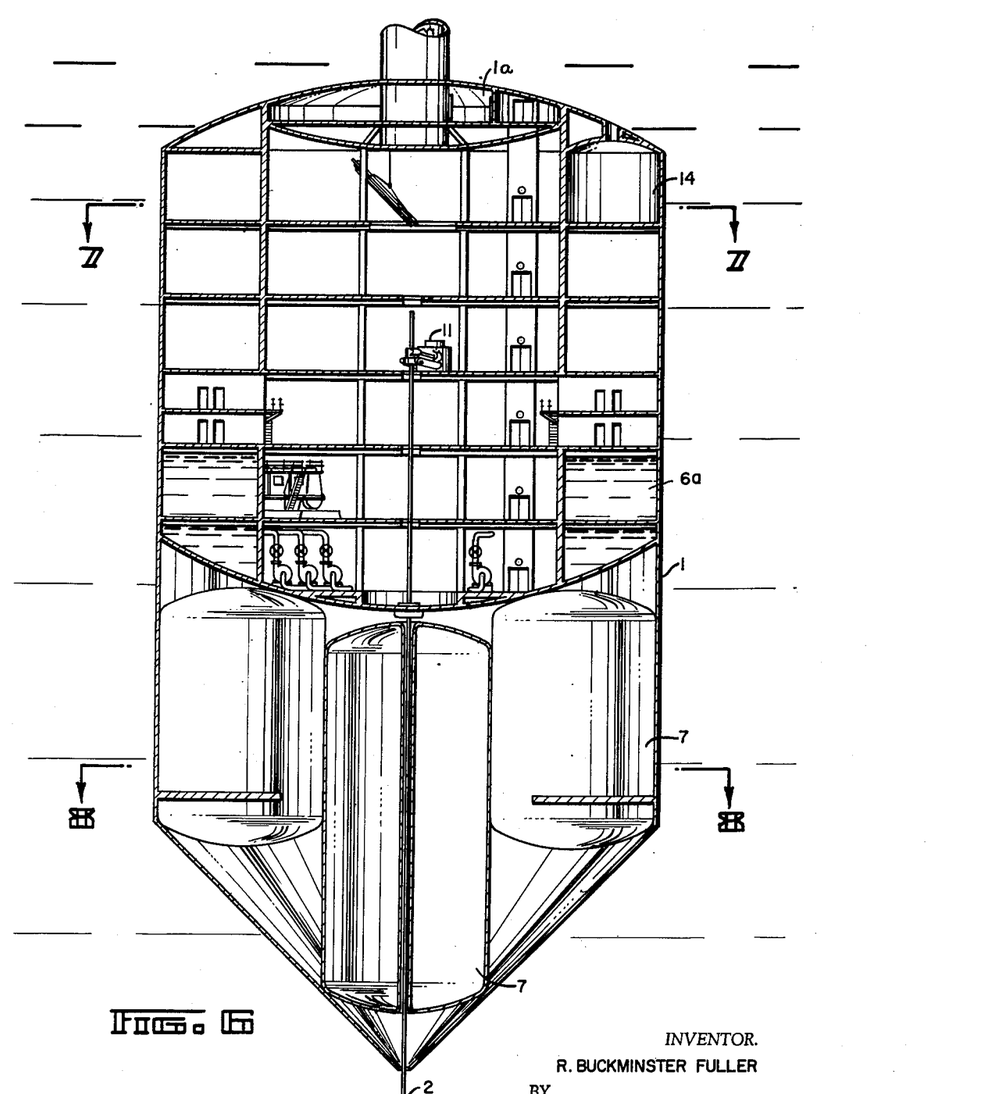
FIG. 6 is a central vertical cross sectional view of the well rig caisson of FIG. 1.
Figure 8:
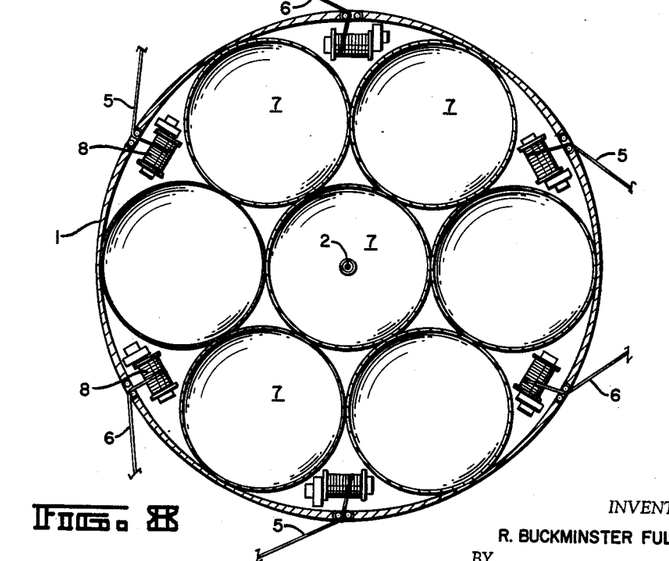
FIG. 8 is a similar view on line 8—8 of FIG. 6 (buoyancy control tanks shown in top plan).

Inside the well rig caisson 1 buoyancy regulating tanks 7, FIGS. 6 and 8, provide a controlled buoyancy. Sea water is pumped in and out of selected tanks by means of suitable pumping machinery such as used in controlling water ballast in ships. FIG. 8 shows the buoyancy tanks disposed in closest packing arrangement. In this arrangement lateral stability can be effectively controlled in all directions. This arrangement also is well adapted for the accommodation of anchor winches uniformly spaced around the inside periphery of the caisson. Thus, in FIG. 8, we see the winches 8 for anchor rodes 5 and 6 mounted in flooded spaces within the lower compartment of caisson 1. These winches may be conveniently operated by hydraulic drives controlled from within the water-tight operating space in the upper part of the caisson. The tangential arrangement of the anchor rodes creates large stresses in the shell of the caisson. To accept such loading the thickness of the shell plating is built up adjacent the hawse openings for the rodes. Suitable sheaves or rollers may be provided at the sides of the hawse openings to avoid undue wear on the anchor cables as the rodes are tightened or slackened to balance the torques in the two tetrahedral systems and regulate the catenary sags in the rodes.

Figure 7:
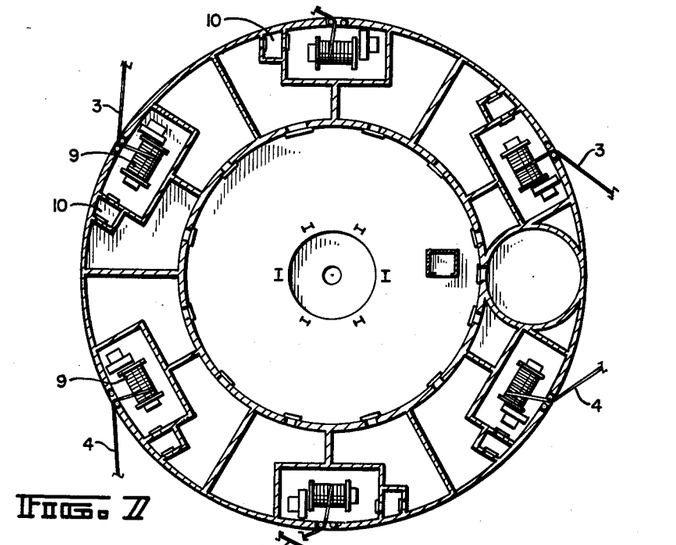
FIG. 7 is a horizontal cross sectional view taken on line 7—7 of FIG. 6.

In FIG. 7 we see another set of anchor winches 9, for the rodes 3 and 4, arranged in flooded spaces sealed off from the interior working spaces of the caisson. Air lock chambers may be provided for access to the winch compartments, such chambers being shown at 10 in FIG. 7. The interior working space of the caisson preferably is decked and bulkheaded as shown in FIG. 6, and provided with intercommunicating elevators and stairways. Openings in the floors below the rotary table and draw-works 11 of the well drilling rig accommodate the drill pipe and its casing. This arrangement eliminates the need for separate derrick structure, the decked and bulkheaded caisson itself serving in effect as the derrick of the rig.

Figure 10:
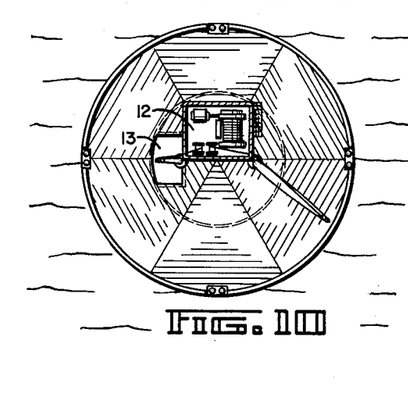
FIG. 10 is a horizontal cross sectional view at enlarged scale taken on line 10—10 of FIG. 9.
Figure 11:
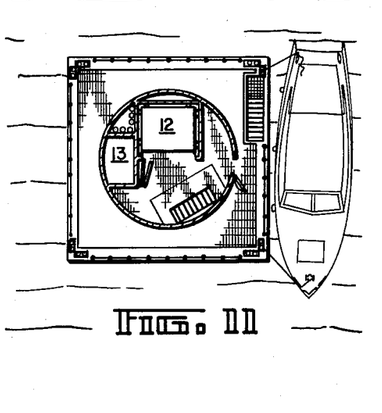
FIG. 11 is a similar view on line 11—11 of FIG. 9.
Figure 12:
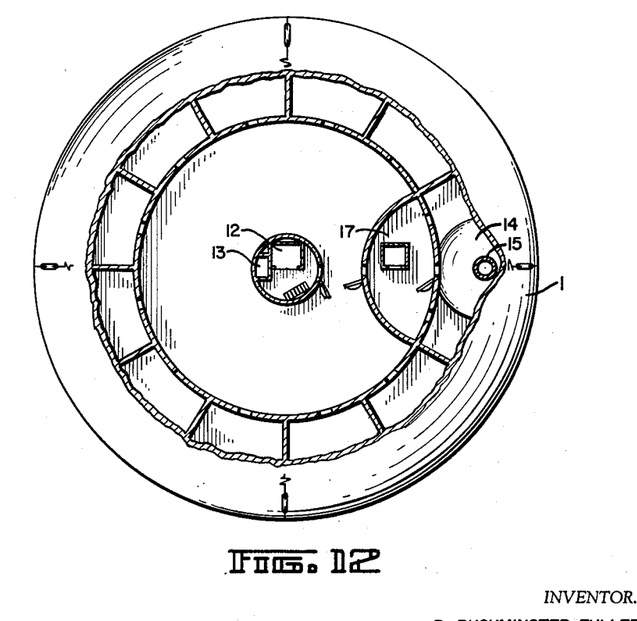
FIG. 12 is a similar view on line 12—12 of FIG. 9.

The hollow communications shaft which extends from within the caisson to the decks above the surface of the sea will be provided with an elevator 12 for personnel and freight, and may also have a shaft 13 (FIGS. 9 through 12) through which long sections of drill pipe and casing may be lowered from the cargo receiving deck, FIG. 10. Water-tight compartments 1a at the top of the caisson provide a means of temporarily sealing off the working spaces from the communications shaft in the event that this shaft should be damaged and flooded as a result of collision or from other causes. The main cargo deck of the communications shaft will be located some 60 feet above means high tide so as to be beyond the reach of damage by high seas. The lower deck, FIG. 11, used principally for purposes of boarding from small craft, will be closer to the surface of the sea but it is small and has an open work deck so as to offer little resistance to the pounding of the waves.

The oil well rig will include the various kinds of machinery and auxiliary equipment customary to offshore oil well operations including the aforementioned rotary table and draw-works 11, mud pumps, mud tank, blowout preventers, tanks, etc. Suitable means will be provided for conveying the oil to tankers brought alongside. During periods when weather conditions do not permit tankers to be in position to take on oil, the oil may be flowed into storage tanks 6a within the caisson, buoyancy meanwhile being maintained by pumping sea water from within the buoyancy tanks 7.

In the preferred construction shown I have provided a chamber 14 and safety bulkhead 17 (see FIG. 12, the upper part of FIG. 6, and the lower part of FIG. 9) from which extends a flexible air supply and escape shaft 15 floated on the surface of the sea by a suitable raft 16 through which crew members may be hoisted on bosun's chairs lowered from a rescue vessel.

Figure 13:
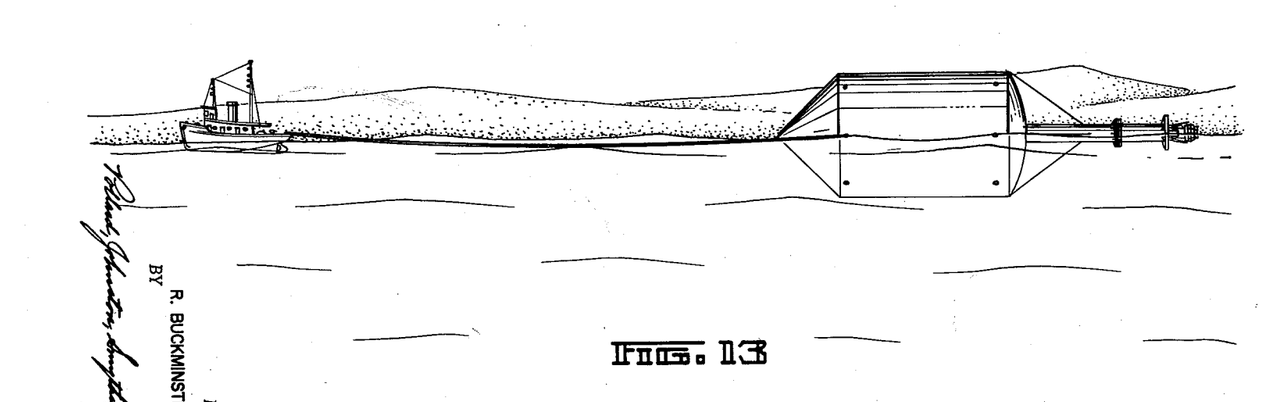
FIG. 13 is a side elevational view of the oil well rig floating as a surface ship in a horizontal position favorable for towing between drilling sites.
Figure 14:
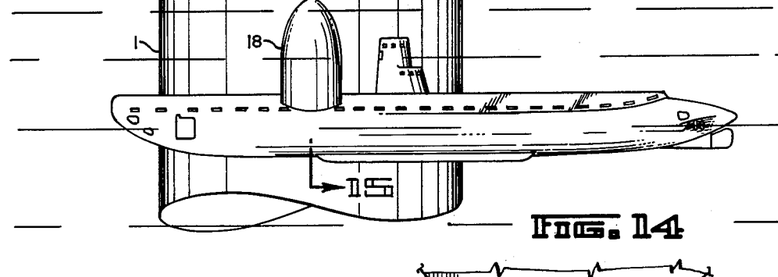
FIG. 14 is a side elevational view illustrating the adaptation of my specially anchored caisson used as a submerged operating base with provision for harboring submarines.
Figure 15:
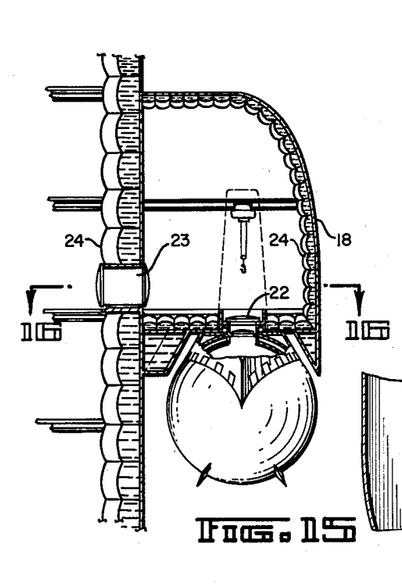
FIG. 15 is a detail vertical cross sectional view taken on line 15—15 of FIG. 14.
Figure 16:
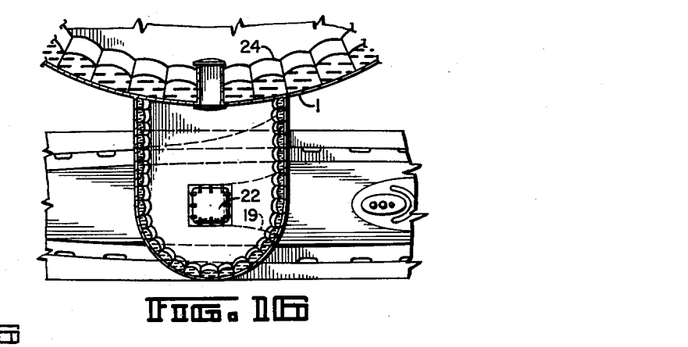
FIG. 16 is a detail horizontal cross sectional view taken on line 16—16 of FIG. 15.
Figure 17:
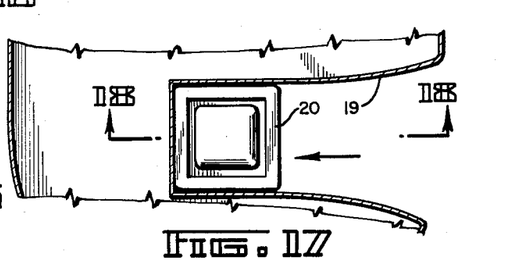
FIG. 17 is a detail horizontal cross sectional view showing the slip for receiving the access hatchway of the submarine.
Figure 18:
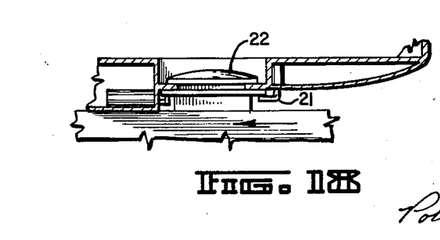
FIG. 18 is a detail vertical cross sectional view taken on line 18—18 of FIG. 17.

By regulating the ballasting and buoyancy of the rig, it can be floated in the position shown in FIG. 13 for towing to and from anchorages. A pair of anchor rodes at opposite sides of the lower end of the caisson can be tied together as a towline and the coniform shape of the lower end of the caisson furnishes fair water entry as the bow of a barge.

With reference to FIGS. 14–18, I shall now describe the application of my undersea island as a manned operating base provided with submarine berthing and communication facilities. The caisson 1, FIG. 14, may be of the general form described with reference to FIG. 1, and it will be anchored as before with the counter-torquing rode system. At a point preferably well above the points of attachment or entry of the rodes, is a berth for a submarine such as may be comprised within the blister 18. The bottom of the blister has a slip 19, FIG. 17, having a flared entrance functioning like a ferry slip to guide the submarine into its berth. The sides of a hatchway 20 fit within the slip 19. The hatchway 20 being located on the deck of the submarine ahead of its conning tower, the submarine can be visually conned to its berth. Suitable dogs 21, FIG. 18, operated from within the blister secure the hatchway against the bottom of the blister adjacent an entrance hatch 22 thereof. The blister compartment 18 gives access to the caisson proper through a bulkhead compartment 23. The shell of the caisson and blister preferably is triple and bulkheaded or quilted as at 24. The outer set of quilted spaces is filled with liquid, and the inner set with air, providing a double shell, liquid and air, to make it torpedo proof.

The terms and expressions which I have employed are used in a descriptive and not a limiting sense, and I have no intention of excluding such equivalents of the invention described as fall within the scope of the claims.

I claim:

1. Anchoring for an undersea island, comprising six anchor rodes arranged in three criss-crossing pairs distributed so as to extend tangentially away from the sides of the island in several directions, the anchors for one rode of each pair defining the base corners of a tetrahedron whose apex is the undersea island and the anchors of the other rode of each pair defining a similar tetrahedron whereby two counter-torquing tetrahedra are provided.

2. An undersea island comprising a buoyant caisson and catenary anchor rodes, the buoyant caisson submerged solely under the pull of the catenary anchor rodes which extend tangentially from the sides of the caisson to anchors distributed around it, at least three of the rodes extending tangentially clockwise at least three tangentially counterclockwise in tangency to a real or imaginary cylinder whose diameter is substantially at least as great as the longest horizontal dimension of the caisson, the rodes which extend clockwise constituting a group of rodes tending to produce clockwise rotation of the caisson about a vertical axis and the rodes which extend counterclockwise constituting a group of rodes tending to produce counterclockwise rotation, the one group of rodes creating a torque which is equal and opposite to that created by the other, by virtue of all of which the caisson is fixed in the grip of opposed torques while yielding to slow vertical movement with the tides against the resilient pull of the catenary sags in the rodes.

References Cited in the file of this patent

UNITED STATES PATENTS

| | | |
|---|---|---|
| 138,293 | Stoner | Apr. 29, 1873 |
| 1,159,519 | Menier | Nov. 5, 1915 |
| 2,476,309 | Lang | July 19, 1949 |
| 2,503,516 | Shrewsbury | Apr. 11, 1950 |
| 2,777,669 | Willis et al. | Jan. 15, 1957 |
| 2,881,591 | Reeve | Apr. 14, 1959 |

UNITED STATES PATENT OFFICE
CERTIFICATE OF CORRECTION

Patent No. 3,080,583                                  March 12, 1963

Richard Buckminster Fuller

It is hereby certified that error appears in the above numbered patent requiring correction and that the said Letters Patent should read as corrected below.

Column 3, line 16, strike out "is", first occurrence; column 5, line 15, for "means" read -- mean --; column 6, line 19, after "Anchoring" insert -- system --; line 33, after "clockwise" insert -- and --.

Signed and sealed this 19th day of November 1963.

(SEAL)
Attest:

ERNEST W. SWIDER

Attesting Officer

EDWIN L. REYNOLDS

Acting Commissioner of Patents